United States Patent [19]

Birnkraut et al.

[11] 4,158,588

[45] Jun. 19, 1979

[54] COPOLYMERS OF ETHYLENE, PROCESS FOR PRODUCING THEM AND THEIR USE

[75] Inventors: Hans-Walter Birnkraut, Oberhausen; Werner Kluy, Bochum-Stiepel, both of Fed. Rep. of Germany

[73] Assignee: Ruhrchemie Aktiengesellschaft, Oberhausen, Fed. Rep. of Germany

[21] Appl. No.: 889,357

[22] Filed: Mar. 23, 1978

Related U.S. Application Data

[63] Continuation of Ser. No. 754,231, Dec. 27, 1976, abandoned, which is a continuation of Ser. No. 620,820, Oct. 8, 1975, abandoned.

[30] Foreign Application Priority Data

Oct. 10, 1974 [DE] Fed. Rep. of Germany ....... 2448342

[51] Int. Cl.$^2$ .......................... C09J 3/02; B05D 3/02; B05D 5/10
[52] U.S. Cl. .................................... 156/331; 156/334; 427/207 B; 427/385 R; 427/385 A; 427/385 B; 427/385 C; 427/388 R; 427/389; 427/390 R; 427/391; 427/393; 428/442; 428/463; 428/473; 428/500; 428/514; 428/522; 428/537; 526/303

[58] Field of Search ........... 427/385 R, 385 A, 385 B, 427/385 C, 207 B, 390 R, 389, 388 R, 391, 393; 526/303, 329; 156/331, 334; 428/442, 463, 473, 500, 514, 522, 537

[56] References Cited

U.S. PATENT DOCUMENTS

| 3,405,200 | 10/1968 | Yasumura et al. | 260/897 |
|---|---|---|---|
| 3,451,982 | 6/1969 | Mortimer | 526/303 |
| 3,458,487 | 7/1969 | Mortimer | 526/303 |
| 3,755,237 | 8/1973 | Isaac et al. | 526/303 X |
| 3,891,603 | 6/1975 | Heil et al. | 526/303 X |

*Primary Examiner*—Ronald H. Smith
*Assistant Examiner*—Thurman K. Page
*Attorney, Agent, or Firm*—Bierman & Bierman

[57] ABSTRACT

This invention relates to novel quaternary copolymers and their preparation. The quaternary copolymers consist of 70–90 parts ethylene, 0.5–15 parts of an alkyl ester (wherein said alkyl group contains up to 8 carbon atoms) of an unsaturated monocarboxylic acid having 3–6 carbon atoms or a vinyl ester of a saturated monocarboxylic acid having up to 3 carbon atoms, 0.5–10 parts of an amide of an unsaturated monocarboxylic acid having 3–6 carbon atoms, and 0.15 parts of a vinyl ether having up to 10 carbon atoms; the sum of the parts totalling 100.

16 Claims, No Drawings

COPOLYMERS OF ETHYLENE, PROCESS FOR PRODUCING THEM AND THEIR USE

This is a Rule 60 Continuation Application of Ser. No. 754,231 filed on Dec. 27, 1976, now abandoned, which is itself a continuation application of Ser. No. 620,820 filed on Oct. 8, 1975, now abandoned, and which claims the priority of German Patent Application P 24 48 342.9 filed on Oct. 10, 1974.

This invention relates to quaternary copolymers containing ethylene as the main constituent. Combined with the ethylene are an ester of an unsaturated carboxylic acid and a saturated alcohol of a vinyl ester of a saturated carboxylic acid, the amide of an unsaturated carboxylic acid, and an alkyl vinyl ether.

German published Patent Application DAS 1,645,018 describes the copolymerization of ethylene with tert-butylamino ethyl methacrylate or an ester of an unsaturated carboxylic acid, and the amide of an unsaturated carboxylic acid to produce copolymers useful for the production of hollow shaped articles and film. These articles can be produced by the usual methods, such as casting, extrusion and injection molding.

German published Patent Application DAS 1,645,024 relates to a process for producing ethylene copolymers containing from 1–10 mole percent of a vinyl ether, from 0.5–20 mole percent of unsubstituted acryl or methacrylamides and 70–98.5 mole percent of ethylene.

German Patent Application P 24 00 978.7 of the present inventors, which has not yet been published, teaches a process for bonding together or coating materials using as an adhesive or coating composition, an olefin copolymer. This copolymer contains 70–90 parts of ethylene, 0.5–10 parts of the amide of an ethylenically unsaturated carboxylic acid and 0.5–20 parts of the ester of an ethylenically unsaturated carboxylic acid. When producing polymers having the composition mentioned above it is necessary, to achieve commercially useful melt flow indices, to maintain high modifier concentrations. For example, the polymerization is effected in the presence of 10–12 percent of propane as a modifying ingredient. This percentage is based on the weight of ethylene. This substantial dilution of the ethylene results in a marked reduction in conversion. Such high concentrations of modifier are not necessary in the process according to the present invention because the vinyl ether has a molecular weight-controlling action. In addition, the adhesive properties of these polymers are largely dependent upon their composition. Maximum adhesive strength is achieved only within a very narrow concentration range of the comonomers. Therefore, it is necessary when producing the polymer that the individual components are maintained in the precise proportion required.

The prior art also shows the use of binary and tertiary ethylene copolymers containing acrylic acid for bonding and coating various materials and substrates. These high molecular weight compounds also exhibit inherent deficiencies which are due to the presence of carboxyl groups in the macromolecule. Because of the formation of hydrogen bridges, the carboxyl groups favor the accumulation of water between the coating and the substrate. This results in delamination and detachment of the polymer from the substrate. This phenomenon is particularly serious in cases in which the bonding mechanism is based on the carboxylic acid groups of the adhesion promoter; for example, when the copolymers adhere to metals.

It has now been found that the deficiencies and disadvantages mentioned above are not exhibited by the quaternary copolymers of the present invention. These copolymers consist of 70–90 parts of ethylene, 0.5–15 parts of an alkyl ester (wherein the alkyl group contains up to 8 carbon atoms) of an unsaturated monocarboxylic acid having 3–6 carbon atoms or the vinyl ester of a saturated monocarboxylic acid having up to 3 carbon atoms, 0.5–10 parts of an amide of an unsaturated monocarboxylic acid having 3–6 carbon atoms, and 0.1–5 parts of a vinyl ether having up to 10 carbon atoms; the sum of the parts totalling 100.

It is a preferred embodiment of this invention that the quaternary copolymers contain 80–90 parts of ethylene, 7–12 parts of an alkyl ester (wherein the alkyl group contains up to 8 carbon atoms) of an unsaturated monocarboxylic acid or a vinyl ester of a saturated monocarboxylic acid having up to 3 carbon atoms, 5–8 parts of an amide of an unsaturated carboxylic acid having 3–6 carbon atoms and 0.1–1 part of an aliphatic or aromatic vinyl ether having up to 10 carbon atoms; the sum of the parts totalling 100.

The above mentioned quaternary copolymers are characterized by crystalline melting points of 95° C.–100° C. and densities of 0.925–0.938, measured according to DIN 53 479. Products having melt flow index values of 0.1–100, especially those having melt flow index values between 1 and 50 are suitable as adhesives. As compared with terpolymers of ethylene, acrylic acid and acrylic acid esters, the quaternary copolymers have a higher modulus of elasticity.

Examples of esters of unsaturated carboxylic acids which made be used as comonomers include ethyl acrylate, n-propyl acrylate, n-butyl acrylate, tert-butyl acrylate, tert-butyl methacrylate, tert-butyl crotonate, and 2-ethyl hexyl acrylate. Particularly suitable are the esters of acrylic and methacrylic acids with tert-butanol and tert-amyl alcohol. Vinyl acetate is representative of the vinyl esters of saturated carboxylic acids.

For the purposes of this invention,, acrylamide, methacrylamide and crotonic acid amide are the preferred amides of unsaturated carboxylic acids.

Examples of copolymerizable ethers include methyl vinyl ether, ethyl vinyl ether, propyl vinyl ether, i-butyl vinyl ether, and n-butyl vinyl ether. The type of the ether used does not affect the adhesiveness of the copolymer.

The copolymers according to the present invention are produced at pressures of 400 to 4,000 bars and temperatures of 100° C. to 350° C. The polymerization is carried out in the presence of catalytic quantites of free radical initiators (e.g. oxygen, in amounts of 2 to 250 molar parts per million parts of ethylene). Furthermore, peroxides and other free radical forming substances, such as tert-butyl perbenzoate, dilauryl peroxide, didecanoyl peroxide, di-tert-butyl peroxide, azoisobutyrodinitrile may be used alone or in mixture in amounts of 2 to 200 molar parts per million parts of ethylene. The polymerization may be effected in the presence of modifying ingredients such as aliphatic alcohols, aliphatic saturated carbonyl compounds, chlorinated hydrocarbons and hydrogen. The process according to this invention may be effected either continuously or batchwise; the continuous operation is preferred. When operating continuously, the copolymer is withdrawn from the reactor. The unreacted portion of the monomers, the initiator and the modifying ingredients are then recycled.

The quaternary copolymers prepared according to the present invention, which contain 0.1 to 1.0% of an alkyl vinyl ether, exhibit excellent adhesive strength on various substrates such as metals and woods. This adhesive strength is maintained at a high level regardless of the ratio of the other comonomers.

The copolymers strongly adhere to the substrate as coatings, impregnations and surface layers, especially if applied in the molten state. The copolymers may be used in this manner as thermal plastic adhesives for metals, ceramic materials, paper, textiles, wood, glass, leather and plastic materials.

Due to the presence of hydrophilic amide groups, the quaternary polymers may also be processed to produce stable emulsions which permit the use of the polymers in finely devided form. When used in the form of emulsions and solutions of the copolymers, it is possible to produce very thin films on metals, ceramic materials, glass, textiles, wood, paper, leather, and plastic materials. These films are useful as adhesives for lamination with polyolefins such as polyethylene or rubber.

A surprising result of the present invention is that a smaller amount of an alkyl ester of an unsaturated carboxylic acid is needed than that which would be expected to obtain satisfactory adhesive strength. This result is shown even when the copolymer contains only a small amount of an alkyl ether.

The polymers or the materials that are impregnated with the polymers can be printed. Their affinity with dyes is remarkable. In addition, the copolymers are useful as additives in coating compositions, especially those polymers which contain a relatively high proportion of copolymerized comonomers.

The following examples illustrate the production of the new polymers and their use for bonding or coating substrates and materials. In these examples, parts and percentages are by weight unless otherwise stated.

A. PRODUCTION OF THE POLYMERS

The quaternary copolymers are produced in a continuously operated laboratory autoclave unit, comprising an autoclave equipped with a magnetic stirrer and an electrical heater. Before it is introduced into the autoclave, the ethylene is mixed with gaseous additives such as oxygen as an initiator and, if necessary or desired, propane as a modifier. The mixture is then compressed to the reaction pressure. The reaction mixture is then passed through a preheater and into the autoclave. At the same time, the comonomers, if necessary, are dissolved or diluted and are then fed into the reactor by means of two high pressure metering pumps having different deliveries. Low molecular weight polar organic compounds such as methanol, ethanol and butanol have been found to be particularly useful solvents. The polymerization is effected at temperatures between 170° C. and 280° C. The polymer-monomer mixture leaving the reactor is depressurized to about 2 to 3 bars by means of a control valve. In doing so, the polymer formed is separated and collected in alternately filled receivers.

B. DETERMINATION OF ADHESIVE STRENGTH

Cleaned aluminum strips of 100 mm. in length, 100 mm. in width and 1.5 mm. in thickness were bonded together by pressing (pressure, 3 kgs./sq.cm.; pressing time, 30 to 40 seconds; compression temperature 180° C.) over a length of 70 mm. by means of films consisting of the particular ethylene copolymers and produced by compression or extrusion through a slot die. In another experiment, aluminum strips having the same dimensions were bonded under the same conditions to a sheet of high pressure polyethylene of 4 mm. thickness. The unbonded lengths of the aluminum strips were bent at right angles in opposite directions.

The adhesive properties are primarily demonstrated by the peel strength. This value represents the force per tear length which is necessary to break the bond. With respect to the adhesive property, it is necessary to differentiate between the force required to initiate peeling and the force required to maintain peeling per tear length. The force to maintain peeling is important in determining the adhesive strength of the product being tested.

The physical data mentioned above is determined by means of a tensile tester. Metal sheets (30 mm. by 100 mm.) are bent at an angle and are placed in the grippers of the testing machine in such a manner that the adhesive coated surface (70 mm. by 100 mm.) extends at right angles with respect to grippers. The system is pulled apart at a rate of 50 mm./minute. At the same time, the tearing forces which are characteristic of the strength properties are recorded.

EXAMPLE 1

A reaction mixture consisting of 97.62% of ethylene, 1.12% of acrylamide, 1.12% of tert-butyl acrylate, and 0.14% of isobutyl vinyl ether and compressed to 1,900 atm. is continuously fed into the inlet of the reactor described above. The polymerization is effected in the presence of 5 molar parts of oxygen per million parts of ethylene at a reaction temperature of 249° C. After a residence time of 55 seconds of the reaction mixture in the reactor, the copolymer is discharged. An overall 8.1% conversion to polymer is obtained. The polymer contains 84.14% of ethylene, 7.7% of acrylamide, 8.0% of tertbutyl acrylate, and 0.16% of isobutyl vinyl ether in copolymerized form.

The melt flow index (MFI 190/2) is 4.0.

The adhesive properties of the product are determined by the method described above. The peel strengths are as follows:

Force to initiate peeling      10.0 kgs./cm.
Force to maintain peeling     3.0 kgs./cm.

EXAMPLE 2

As described in example 1, a reaction mixture consisting of 98.0% of ethylene, 1.05% of acrylamide, 0.88% of tert-butyl acrylate, and 0.24% of n-but vinyl ether is continuously fed into the reactor and compressed to 2,200 atm. The polymerization is effected at 245° C. and in the presence of 3 molar parts of oxygen per million parts of ethylene. An overall 8.3% conversion to polymer is obtained. The copolymer consists of 85.4% ethylene, 7.7% of acrylamide, 6.7% of tert-butyl acrylate, and 0.2% of n-butyl vinyl ether. The melt flow index of the product is 1.3. The peel strengths are as follows:

Force to initiate peeling      7.4 kgs./cm.
Force to maintain peeling     2.6 kgs./cm.

EXAMPLE 3

A reaction mixture consisting of 97.6% of ethylene, 0.97% of acrylamide, 0.97% of tert-butyl acrylate, and 0.46% of ethyl vinyl ether and compressed to 2,250 atm.

is introduced into the reactor at a temperature of 252° C. and in the presence of 6 molar parts of oxygen per million parts of ethylene, the residence time of the reaction mixture in the reactor being 56 seconds. A copolymer consisting of 86.2% of ethylene, 7.3% of tert-butyl acrylate, 6.0% of acrylamide, and 0.5% ethyl vinyl ether is obtained with an 7.9% overall conversion.

The polymer has a melt flow index (MFI 190/2) of 6.5, a density of 0.926 and a crystalline melting point of 98° C. The values measured for Shore A and D hardness are 87 and 40, respectively. The peel strengths are as follows:

Force to initiate peeling     13.6 kgs./cm.
Force to maintain peeling     2.9 kgs./cm.

EXAMPLE 4

A reaction mixture consisting of 97.84% of ethylene, 0.96% of acrylamide, 0.96% of tert-amyl acrylate, and 0.24% of n-butyl vinyl ether are introduced into the reactor. Polymerization is effected under a pressure of 1,900 atm., in the presence of 3 molar parts of oxygen per million parts of ethylene are used as an initiator and 1.5 molar parts of propane per 100 parts of ethylene as a polymerization controlling agent. After a residence time of 54 seconds of the reaction mixture in the reactor, a copolymer consisting of 87.4% of ethylene, 5.8% of acrylamide, 6.6% of tert-amyl acrylate, and 0.2% of n-butyl vinyl ether is obtained, the conversion to polymer being 8.3%. The melt flow index is 6.0. The peel strengths are as follows:

Force to initiate peeling     13.1 kgs./cm.
Force to maintain peeling     2.4 kgs./cm.

EXAMPLE 5

A reaction mixture consisting of 97.7% of ethylene, 0.92% of acrylamide, 0.92% of n-butyl acrylate, and 0.47% of n-butyl vinyl ether is introduced into the reactor. The polymerization is effected under a pressure of 2,200 atm. The initiator concentration is 4 molar parts oxygen per million parts of ethylene and the reaction temperature is 242° C. After a residence time of 53 seconds in the reactor, a copolymer consisting of 86.9% ethylene, 5.6% of acrylamide, 7.0% of n-butyl acrylate, and 0.5% of n-butyl vinyl ether in copolymerized form is obtained. The overall conversion amounts to 8.9%. The melt flow index is 5.1. The peel strengths are as follows:

Force to initiate peeling     10.0 kgs./cm.
Force to maintain peeling     2.5 kgs./cm.

EXAMPLE 6

A reaction mixture of 91.3% of ethylene, 1.0% of methacrylamide, 7.0% of vinyl acetate, and 0.3% of isobutyl vinyl ether is fed into the polymerization reactor, in the presence of 6 molar parts of oxygen per million parts of ethylene as the polymerization initiator, the resulting reaction mixture being continuously discharged. The pressure in the reactor is 2,000 atm. and the temperature is 252° C. After a reaction time of one hour 1150 g of copolymer consisting of 85.7% ethylene, 6.9% methacrylamide, 7.1% of vinyl acetate, and 0.3% of i-butyl vinyl ether in copolymerized form is obtained, the conversion being 8.1%. The melt flow index is 43. The peel strengths are as follows:

Force to initiate peeling     8.3 kgs./cm.
Force to maintain peeling     2.1 kgs./cm.

COMPARATIVE EXAMPLE 1

The procedure is as described in Example 1 through 6, except that the polymerization is effected in the absence of esters of unsaturated carboxylic acid and vinyl ether, a reaction mixture of 99.0% of ethylene and 1% of acrylamide is polymerized. A copolymer consisting of 91.9% of ethylene and 8.1% of acrylamide in copolymerized form is obtained, the conversion to polymer being 8.2%. The melt flow index is 0.1. The peel strengths are as follows:

Force to initiate peeling     3.2 kgs./cm.
Force to maintain peeling     0.5 kgs./cm.

COMPARATIVE EXAMPLE 2

The procedure is as described in Examples 1 through 6, except that the polymerization is conducted with a reaction mixture of 97.6% of ethylene and 2.4% of n-butyl acrylate. The resultant copolymer consists of 34% of ethylene and 16% of n-butyl acrylate in copolymerized form. The product has a melt flow index of 1.9 and no adhesion.

COMPARATIVE EXAMPLE 3

The procedure is as described in Examples 1 through 6, except that ethylene is polymerized with acrylamide and vinyl isobutyl ether in a 7.8% overall yield. The resultant ethylene copolymer consists of 92.9% ethylene, 6.1% of acrylamide, and 1.0% of vinyl isobutyl ether in copolymerized form. The melt flow index is 1.0. The peel strengths are as follows:

Force to initiate peeling     3.8 kgs./cm.
Force to maintain peeling     0.5 kgs./cm.

COMPARATIVE EXAMPLES 4 through 9

The polymerizations are effected by the procedure described in Examples 1 through 6. The comonomer concentrations in the starting reaction mixtures are selected so that the resultant copolymers consist of 79 to 85% ethylene, 6 to 8% of acrylamide and 8.6, 9.0, 9.7, 11.1 and 13.6% of n-butyl acrylate or tert-butyl acrylate. The melt flow index values are 0.9, 0.7, 0.3, 9.8, 3.5, 4.4, respectively. The measured peel strengths are shown in Table 1. It is clear that terpolymers having an acrylamide content in the range from 6 to 8% give optimum peeling strengths if the copolymer contains approximately 9 to 12% of acrylic acid ester. If 0.1 to 0.5% by weight of alkyl vinyl ether is incorporated into the polymer, only 7 to 8% of acrylic acid ester is necessary to achieve the same peel strength.

Table 1

Adhesive properties of ethylene copolymers

| Run No. | Composition of the polymer in % by weight | | | | Peel strengths in kgs./cm. | |
|---|---|---|---|---|---|---|
| | unsaturated ester | unsaturated amide | vinyl alkyl ether | ethylene | initiation of peeling | maintaining peeling |
| 1 | — | 8.1 | — | 91.9 | 3.2 | 0.5 |
| 2 | 16.0 | — | — | 84.0 | no adhesion | |
| 3 | — | 6.1 | 1.0 | 92.9 | 3.8 | 0.5 |
| 4 | 8.6 | 6.4 | — | 85.0 | 5.3 | 1.9 |
| 5 | 9.0 | 6.4 | — | 84.6 | 10.0 | 2.4 |
| 6 | 13.6 | 7.2 | — | 79.2 | 7.3 | 2.3 |
| 7 | 11.1 | 7.1 | — | 81.8 | 11.2 | 2.7 |
| 8 | 9.7 | 6.9 | — | 83.4 | 10.6 | 3.0 |
| 9 | 9.7 | 6.2 | — | 84.1 | 6.7 | 2.9 |
| 10 | 8.0 | 7.7 | 0.16 | 84.14 | 10.0 | 3.0 |
| 11 | 6.7 | 7.7 | 0.2 | 85.4 | 7.4 | 2.6 |
| 12 | 7.3 | 6.0 | 0.5 | 86.2 | 13.6 | 2.9 |
| 13 | 6.6 | 5.8 | 0.2 | 87.4 | 13.1 | 2.4 |
| 14 | 7.0 | 5.6 | 0.5 | 86.9 | 10.0 | 2.5 |
| 15 | 7.1 | 6.9 | 0.3 | 85.7 | 8.3 | 2.1 |

What we claim is:

1. A method of coating a material comprising applying a copolymer consisting essentially of
   (a) a first comonomer comprising 70–90 parts by weight of ethylene per 100 parts by weight of said copolymer.
   (b) a second comonomer said second comonomer being present in an amount of 0.5 to 15 parts by weight per 100 parts by weight of said copolymer, said second comonomer comprising
      (1) an alkyl ester wherein the alkyl group contains up to 8 carbon atoms, of an unsaturated monocarboxylic acid having 3 to 6 carbon atoms, or
      (2) a vinyl ester of a saturated carboxylic acid having up to 3 carbon atoms,
   (c) a third comonomer comprising an amount of an amide of an unsaturated monocarboxylic acid having 3 to 6 carbon atoms, said amount being 0.5 to 10 parts by weight per 100 parts by weight of said copolymer and,
   (d) a forth comonomer comprising an amount of a vinyl ether having up to 10 carbon atoms, said amount being 0.1 to 5 parts by weight per 100 parts by weight of said copolymer, to a first material to form a coated material.

2. The process of claim 1 wherein said first material is selected from the group consisting of metal, ceramic, paper, textile, wood, glass, leather, and plastic.

3. The method of claim 1 wherein said first comonomer is present in an amount of 80 to 90 parts by weight per 100 parts by weight of said copolymer.

4. The method of claim 1 wherein said second comonomer is present in an amount of 7 to 12 parts by weight per 100 parts by weight of said copolymer.

5. The method of claim 1 wherein said third comonomer is present in an amount of 5 to 8 parts by weight per 100 parts by weight of said copolymer.

6. The method of claim 1 wherein said fourth comonomer is present in an amount of 0.1 to 1 part by weight per 100 parts by weight of said copolymer.

7. The method of claim 1 wherein
   (a) said first comonomer is present in an amount of 80 to 90 parts by weight per 100 parts by weight of said copolymer,
   (b) said second comonomer is present in an amount of 7 to 12 parts by weight per 100 parts by weight of said copolymer.
   (c) said third comonomer is present in an amount of 5 to 8 parts by weight per 100 parts by weight of said copolymer, and
   (d) said fourth comonomer is present in an amount of 0.1 to 1 part by weight per 100 parts by weight of said copolymer.

8. The method of claim 1 wherein second second comonomer is selected from the group consisting of tert-butyl acrylate, tert-butyl methacrylate, tert-amyl acrylate, and tert-amyl methacrylate.

9. The method of claim 1 wherein said second comonomer is vinyl acetate.

10. The method of claim 1 wherein said third comonomer is selected from the group consisting of acrylamide, methacrylamide, and crotonic acid amide.

11. The method of claim 1 wherein said fourth comonomer is selected from the group consisting of methyl vinyl ether, propyl vinyl ether, i-butyl vinyl ether, and n-butyl vinyl ether.

12. The method of claim 1 having a melt flow index of 0.1 to 100.

13. The method of claim 1 wherein said melt flow index is 0.1 to 50.

14. The process of claim 1 further comprising fixing said coated material to a second material.

15. The process of claim 14 wherein said coated material is bonded to said second material.

16. The process of claim 14 wherein said second material is selected from the group consisting of metal, ceramic, paper, textile, wood, glass, leather, and plastic.

* * * * *